United States Patent
Schneider et al.

(10) Patent No.: US 7,979,567 B2
(45) Date of Patent: Jul. 12, 2011

(54) SHARING OF SUBSCRIPTIONS TO RESOURCE LIST CONTENT IN RESOURCE LIST SERVER

(75) Inventors: Haim Schneider, Ramot Meir (IL); Benson K. Chen, Durham, NC (US); Anthony W. Wrobel, Jr., Raleigh, NC (US)

(73) Assignee: International Buisness Machines Corporation, Armonk, NY (US)

( * ) Notice: Subject to any disclaimer, the term of this patent is extended or adjusted under 35 U.S.C. 154(b) by 210 days.

(21) Appl. No.: 12/336,885

(22) Filed: Dec. 17, 2008

(65) Prior Publication Data
US 2010/0153485 A1 Jun. 17, 2010

(51) Int. Cl.
G06F 15/16 (2006.01)
(52) U.S. Cl. .................................................. 709/229
(58) Field of Classification Search .................. 709/229
See application file for complete search history.

(56) References Cited

U.S. PATENT DOCUMENTS

| 2005/0050157 | A1 | 3/2005 | Day |
| 2005/0250481 | A1 | 11/2005 | Kiss et al. |
| 2005/0267969 | A1 | 12/2005 | Poikselka et al. |
| 2008/0008185 | A1 * | 1/2008 | Lindgren et al. .............. 370/393 |

FOREIGN PATENT DOCUMENTS

| CN | 1835032 A | 9/2006 |
| WO | 2008043675 A1 | 4/2008 |

* cited by examiner

*Primary Examiner* — Kenny S Lin
*Assistant Examiner* — Farhad Ali
(74) *Attorney, Agent, or Firm* — Cantor Colburn LLP; Prentiss Johnson

(57) ABSTRACT

A method for sharing subscriptions to the content of a resource list includes creating a first subscription to the content of the resource list upon receipt of a first subscription request for the presence state of the list from a first user; receiving a second presence subscription request for the resource list from a second user; sending a one-time request with the identity of the second subscribing user to an XCAP server; receiving an authorization response related to the one-time request; and creating a super user subscription to the content of the resource list, the super user subscription used to provide presence state information about the list members to the first user and the second user.

17 Claims, 3 Drawing Sheets

SHARING OF SUBSCRIPTIONS TO RESOURCE LIST CONTENT IN RESOURCE LIST SERVER

BACKGROUND

The present invention relates to resource lists and, more specifically, to sharing subscriptions to resource list content in a resource list server.

The Session Initiation Protocol (SIP) event notification mechanism allows a user to subscribe to the presence state of a list of resources. Lists are identified by a Uniform Resource Indicator (URI), and may be personal, such as the buddy list of a user, or public, intended to be shared by multiple users.

In the SIP architecture, a presence subscription to a resource list is handled by a Resource List Server (RLS) that aggregates the state of the list members and notifies the subscriber of the state of every resource in the list. The RLS also notifies the subscriber whenever the state of a list member changes.

In a typical SIP architecture, the lists are stored separately from the RLS, in an extensible markup language (XML) repository. The XML Configuration Access Protocol (XCAP) is used to create, modify and retrieve lists from the repository. XCAP allows a client to read, write and modify application configuration data, stored in XML format on a server. XCAP maps XML document sub-trees and element attributes to HTTP URIs, so that these components can be directly accessed by HTTP.

In order to serve a SUBSCRIBE request to a resource list, the RLS first needs to retrieve the content of the resource list from the XCAP server, aggregate the presence state of all list members, and send the aggregated presence information to the subscriber. It is not enough for the RLS to retrieve the current content of the group once, because if a resource is later added or removed from the list, RLS needs to notify the subscriber. Thus, if a resource is added to the list, the RLS needs to send a notification to the presence subscriber, where the notification contains the presence state of the new list member. Similarly, if a resource is removed from the list, the RLS notifies the subscriber that the resource was removed from the list. In order to find out about changes to the content of the list, the RLS needs to subscribe to the content of the list by sending a SIP SUBSCRIBE message to the XCAP server. With this outgoing subscription, if a resource is added or removed from the list, the XCAP server sends a notification about the list change to RLS, and RLS can then notify its incoming subscriber.

With public resource lists, there may be multiple incoming presence subscriptions for the same list. As a result, the RLS creates multiple outgoing list content subscriptions with the XCAP server for the same list (one outgoing list content subscription per each incoming presence subscription). In some case there may exist tens or even hundreds of subscriptions for popular lists. This creates significant overhead on both the RLS and the XCAP Server. In particular, subscriptions represent ongoing sessions and require the server to store the session's state in memory (SIP headers, etc.), which consumes significant amounts of memory. In addition, separate notifications of the list content are sent for each subscription, resulting in a large number of notifications that carry the same information. This creates overhead on the XCAP Server, which needs to generate and send the notifications, and the RLS, which has to process these notifications. Of course, the multiple notifications also generally increases network load.

One solution is for RLS to create only one outgoing subscription to the XCAP server and share the information between all incoming presence subscriptions to the same list. The problem with this solution is that the content of the list is sensitive information and access to the list is subject to access policy defined by the owners of the list and enforced by the XCAP server. If the RLS uses the identity of one of the users in the outgoing subscription to the XCAP server, and then uses this information to send notifications of the state of the list to another subscriber, it actually exposes the content of the list to the second subscriber without verifying that the second subscriber has read access to the content of the list.

SUMMARY

According to one embodiment of the present invention, a method for sharing subscriptions to the content of a resource list is presented. The method of this embodiment includes creating a first subscription to the content of the resource list upon receipt of a first subscription request for the presence state information of the resource list from a first user; receiving a second subscription request for the presence state of the same resource list from a second user; sending a one-time request with the identity of the second subscriber to an XCAP server; receiving an authorization response related to the one-time request; accepting or rejecting the second user's subscription based on the authorization response, and if the authorization response is accepted, replacing the subscription to the content of a list, with a subscription that uses the identity of a "super user" that is authorized to access all lists, and using this super-subscription to provide information related to the content of the list to the first user and the second user.

Another embodiment of the present invention is directed to a system for sharing subscriptions to the content of a resource list. The system of this embodiment includes a plurality of users including a first user, a second user, a third user and an extensible markup language (XML) Configuration Access Protocol (XCAP) server. The system of this embodiment also includes a resource list server (RLS) coupled to the first user and the second user and to the XCAP server. The RLS is configured to create a first outgoing subscription to the content of a resource list upon receipt of a first presence state subscription request from the first user, receive a presence state subscription request for the resource list from the second user, send a one-time request for the resource list to the XCAP server with the identity of the second user, receive an authorization response related to the one-time request, accept or reject the second user's subscription request based on the authorization response, and if the authorization request is accepted, replace the outgoing subscription to the XCAP server with a subscription that uses the identity of a "super user" that is authorized to access all lists, this super-subscription providing information about the content of the list, allowing the RLS to provide presence state information of list members to the first user and the second user. In one embodiment, after creating the super-user subscription, upon receipt of a subscription request from a third user, the RLS is configured to send a one-time request with the identity of the third user to the XCAP server, receive an authorization response and accept or reject the third user's subscription based on the authorization response, and if the request is accepted, use the content list information provided by the super-user subscription to provide presence state information of list members to the third user.

Another embodiment of the present invention is directed to a computer program product for sharing subscriptions to the content of a resource list, the computer program product including a storage medium readable by a processing circuit and storing instructions for execution by the processing circuit for facilitating a method. The method includes creating a first outgoing subscription to the content of the resource list upon receipt of a first subscription request for the presence state of the list from a first user; receiving a second subscription request for the presence state of the resource list from a second user; sending a one-time request with the identity of the second subscribing user to an XCAP server; receiving an authorization response related to the one-time request; accepting or rejecting the second subscribing user's request based on whether the one-time request was authorized; creating a super user subscription to the resource list to replace the first outgoing subscription; the super user subscription providing content of the resource list for all subsequent incoming subscription requests for the presence state of the list and upon receipt of any subsequent subscription request for the presence state of the list, sending a one-time request with the identity of the subscriber to an XCAP server, accepting or rejecting the subscription request based on whether the one-time request was authorized.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
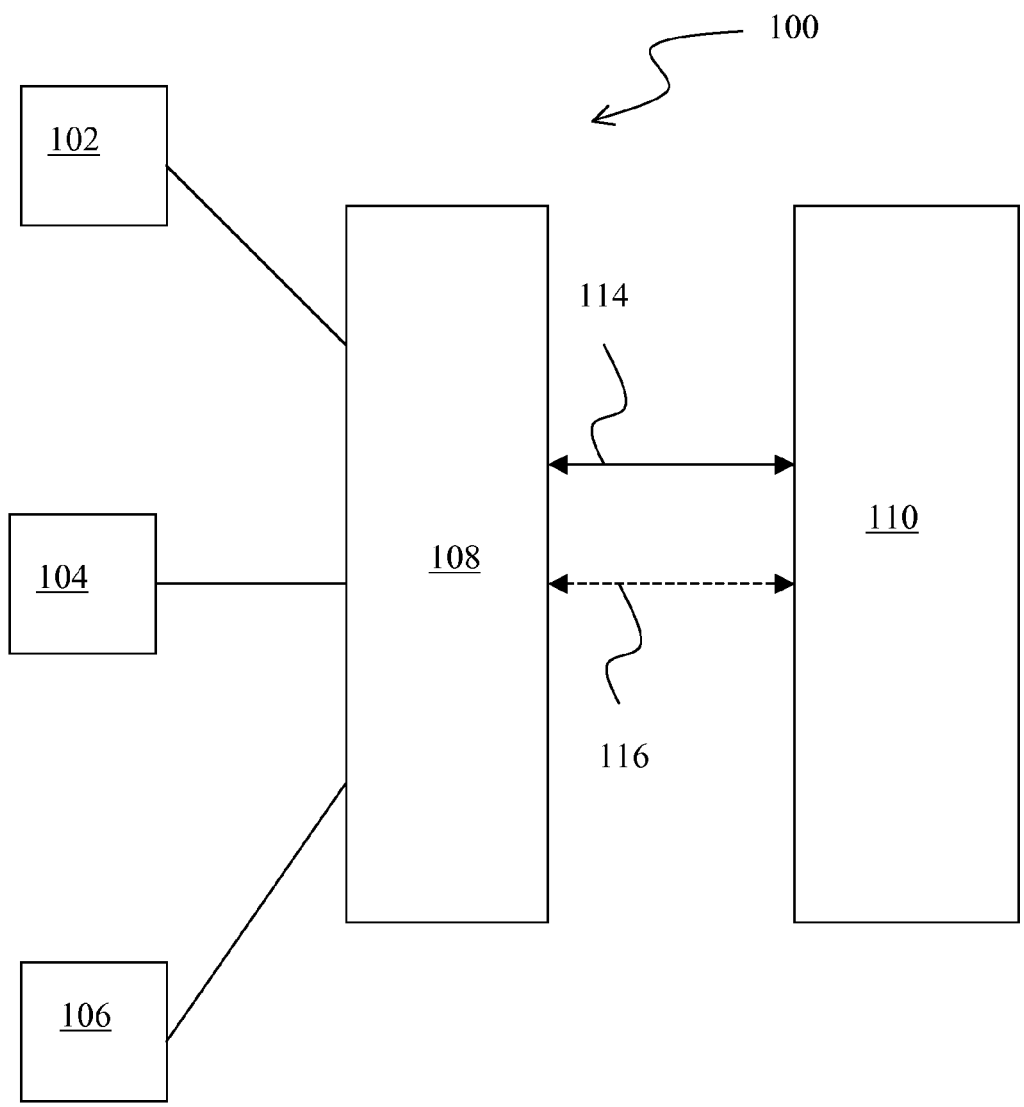
FIG. 1 shows a system according to an embodiment of the present invention.

Embodiments of the present invention are directed to systems and methods for allowing multiple subscribers to use a single subscription to an XCAP server. In one embodiment, the single subscription has a "super user" subscriber identity which is known to the XCAP server and may be referred to herein as a "super user subscription." In order to respect the list access policy, an RLS sends an "XCAP GET" request with the identity of the subscriber for each incoming subscription after the initial subscription.

In one embodiment, the "super user" identity has read access to all lists as defined at the XCAP server. When the RLS receives the first incoming presence subscription to a list, it subscribes to the XCAP server with the identity of the original subscriber. If a second subscriber subscribes to the same list, the RLS replaces the outgoing subscription to the XCAP server with a super user subscription, and from that point on, the super user subscription is shared by all subscribers to the list. The super user subscription is deleted when the last incoming presence subscription to the list is terminated.

After switching to a super user subscription, the RLS needs to verify access right for all subsequent subscribers. To that end, for each subsequent incoming presence subscription request received, the RLS sends an XCAP GET request to the XCAP server with the address (node selector) of the list and the identity of the subscriber. If the XCAP server responds with an "unauthorized" error response, the RLS rejects the incoming subscriber with an "unauthorized" response code. Otherwise, if a successful response is received from the XCAP Server, the RLS accepts the incoming subscription and proceeds handling it.

In one embodiment, one or more optimizations may be implemented. The first optimization includes using the XCAP GET requests only to verify access rights. The RLS does not use the body of the response because it already has the content of the list from the shared outgoing subscription. In order to avoid the unnecessary fetching of the whole list content document, the address (x-path node selector) in the GET request points to a single attribute in the root element of the document, so only that attribute is sent in the response from the XCAP server. Another optimization may include when the RLS finds that it has to replace the outgoing subscription (that was created with the first subscriber identity) with a super user subscription, it doesn't replace the subscription immediately, but only when the first outgoing subscription expires and the RLS has to refresh it anyway (subscriptions in SIP have limited expiration time, and need to be refreshed periodically—typically, about every hour). In the interim period, the outgoing subscription with the original subscriber identity is shared between all incoming subscribers to the list, and the additional XCAP GET requests are sent per every incoming subscription to verify access rights. When the outgoing subscription is about to expire, the RLS creates a new outgoing subscription for the list content, this time with the super-user identity. This way, there is no extra overhead for replacing the subscriber to a super-user subscriber.

Some possible advantages of the present invention may include, but are not limited to, a single shared subscription, list access rights that are respected, and the cost of one-time XCAP GET requests is significantly lower than the cost of maintaining additional outgoing subscriptions per incoming subscriber.

With reference now to FIG. 1, a system 100 according to one embodiment of the present invention is shown. The system 100 includes a plurality of users 102, 104 and 106. As shown, there are three users. Of course, the number of users may vary. A user is identified by a unique user identifier, such as an e-mail address. A user agent application establishes subscriptions on behalf of the user. The user agent may be implemented using any device capable of establishing a subscription such as a telephone, a personal computer, a handheld PDA, or a cellular phone.

The system includes an RLS 108 and an XCAP server 110. The RLS 108 receives requests for presence subscriptions to lists from one or more of the users 102, 104 and 106. Upon receipt of a first request from user 104 for a presence subscription to a resource list 112, the RLS 108 establishes an outgoing subscription (114) for the content of list 112 with the XCAP server 110, using the identity of the user 104. If a second subscriber, user 106, then subscribes to the same list 112, the RLS replaces the outgoing subscription 114 to XCAP server with a super user subscription, and from that point on, the super user subscription 116 is shared by all incoming presence subscribers to the list.

After creation of the super user subscription 116, the RLS 108 verifies access rights for all subsequent incoming subscription requests. In one embodiment, with every incoming presence subscription request after the first one, the RLS 108 sends an XCAP GET request to the XCAP server 110 with the address (node selector) of the list and the identity of the subscribing user. If the XCAP server responds with an "unauthorized" error response, the RLS 108 rejects the incoming subscription request with an "unauthorized" response code. Otherwise, the RLS accepts the incoming subscription request. The RLS then uses the single shared subscription as the source of information about the content of the resource list.

Of course, and as described above, the original outgoing subscription 114 may act as the super user subscription until a subscription refresh time.

Figure 2:
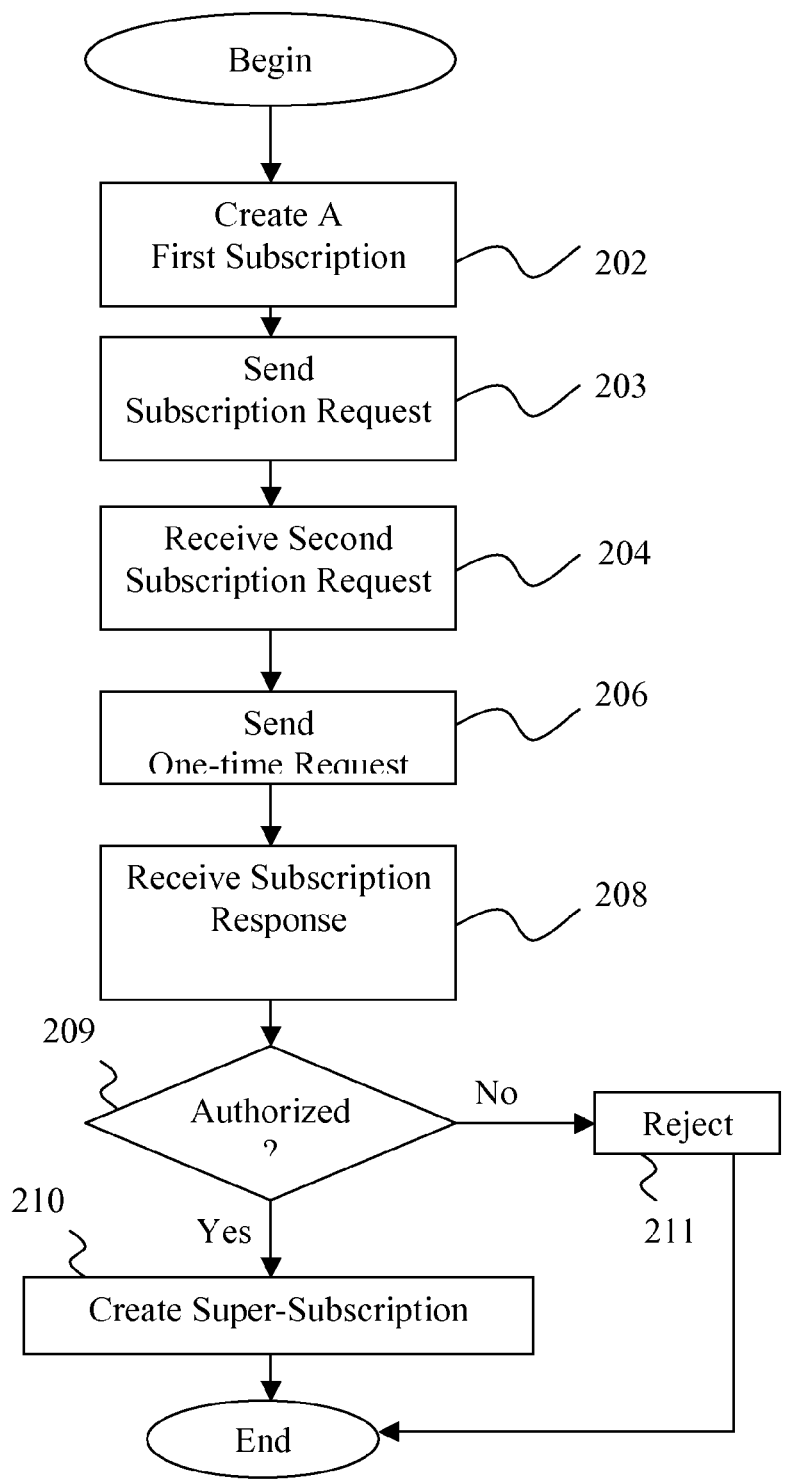
FIG. 2 shows a method according to an embodiment of the present invention.

FIG. 2 shows an example of a method according to an embodiment of the present invention. At a block 202, a first subscription to the presence state information of a particular resource list is created. The first subscription is received by an RLS from a first user (for example user 104 in FIG. 1). At a block 203, the RLS sends a subscription request to the XCAP server, subscribing to the content of the resource list with the identity of the first user.

At a block 204, a second presence subscription request for the resource list is received by the RLS from a second user. The second user may be, for example, the second user 106 shown in FIG. 1. At a block 206 a one-time request is sent from the RLS to an XCAP server in order to check whether the second user has access rights to the content of the list. In one embodiment, the one-time request may be an XCAP GET request to the XCAP server 110 with the address (node selector) of the resource list and the identity of the second user. At a block 208 an authorization response is received from the XCAP server by the RLS. If the XCAP server responds with an "unauthorized" error response, as determined at block 209, the RLS rejects the incoming subscription request with an "unauthorized" response code at block 211. Otherwise, at a block 210, a super user subscription to the resource list is created. The RLS uses the super user subscription as a shared source of information about the content of the list. This allows the RLS server to provide presence state information about the members of the list to all the subscribing users to that list.

Figure 3:
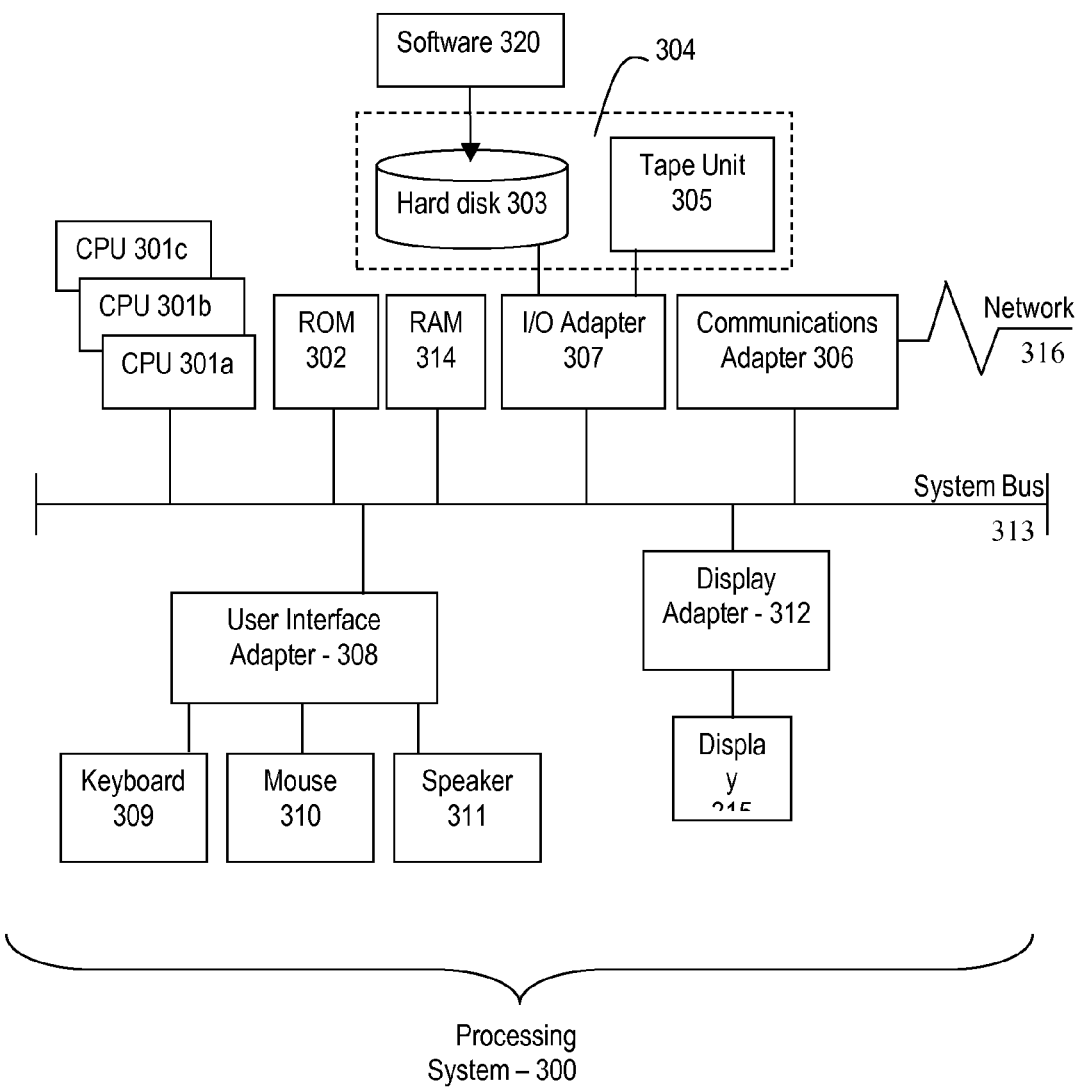
FIG. 3 shows a computing system that may be utilized in an embodiment of the present invention.

FIG. 3 shows an embodiment of a computing system 300 for implementing the teachings herein. In this embodiment, the system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

The system may also include an input/output (I/O) adapter 307 and a network adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 105 are collectively referred to herein as mass storage 304. In one embodiment, the mass storage may include or be implemented as a database for storing enterprise architecture information. A network adapter 306 interconnects bus 313 with an outside network 316 enabling data processing system 300 to communicate with other such systems. A screen (e.g., a display monitor) 315 is connected to system bus 313 by display adaptor 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 313 via user interface adapter 308 and display adapter 312. A keyboard 309, mouse 310, and speaker 311 all interconnected to bus 313 via user interface adapter 308, which may include, for example, a Super I/O chip integrating multiple device adapters into a single integrated circuit.

Thus, as configured in FIG. 3, the system 300 includes processing means in the form of processors 301, storage means including system memory 314 and mass storage 304, input means such as keyboard 309 and mouse 310, and output means including speaker 311 and display 315. In one embodiment, a portion of system memory 314 and mass storage 304 collectively store an operating system such as the AIX® operating system from IBM Corporation to coordinate the functions of the various components shown in FIG. 3.

It will be appreciated that the system 300 can be any suitable computer or computing platform, and may include a terminal, wireless device, information appliance, device, workstation, mini-computer, mainframe computer, personal digital assistant (PDA) or other computing device.

Examples of operating systems that may be supported by the system 300 include Windows 95, Windows 98, Windows NT 4.0, Windows XP, Windows 2000, Windows CE, Windows Vista, Macintosh, Java, LINUX, and UNIX, or any other suitable operating system. The system 300 also includes a network interface 316 for communicating over a network. The network can be a local-area network (LAN), a metro-area network (MAN), or wide-area network (WAN), such as the Internet.

Users of the system 300 can connect to the network 316 through any suitable network adapter 306, such as standard telephone lines, digital subscriber line, LAN or WAN links (e.g., T1, T3), broadband connections (Frame Relay, ATM), and wireless connections (e.g., 802.11(a), 802.11(b), 802.11 (g)).

As disclosed herein, the system 300 includes machine readable instructions stored on machine readable media (for example, the hard disk 304) for capture and interactive display of information shown on the screen 315 of a user. As discussed herein, the instructions are referred to as "software" 320. The software 320 may be produced using software development tools as are known in the art. The software 320 may include various tools and features for providing user interaction capabilities as are known in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. In one embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for sharing subscriptions to the content of a resource list, the method comprising:
    creating a first subscription to the content of the resource list upon receipt of a first subscription request for the presence state of the resource list from a first user;
    receiving a second subscription request for the presence state of the resource list from a second user;
    sending a one-time request with the identity of the second user to an extensible markup language configuration access protocol (XCAP) server;
    receiving an authorization response related to the one-time request, the authorization response accepting or rejecting the second subscription request based on whether the one-time request was authorized;
    creating a super user subscription to the resource list to replace the first subscription, the creating responsive to the second subscription request being accepted;
    using the super user subscription to provide content of the resource list to the first user and the second user, and for all subsequent accepted subscription requests for the presence state of the resource list, thereby consolidating a plurality of subscriptions into the super user subscription; and
    upon receipt of any subsequent subscription request for the presence state of the resource list from a subsequent user, sending the one-time request with the identity of the subsequent user to the XCAP server, and accepting or rejecting the subsequent subscription request based on whether the one-time request was authorized.

2. The method of claim 1, wherein the super user subscription is the only subscription for the resource list between a resource list server and an extensible markup language (XML) Configuration Access Protocol server.

3. The method of claim 2, wherein the super user subscription replaces the first subscription at a refresh time.

4. The method of claim 1, wherein the first subscription and the super user subscription are Session Initiation Protocol subscriptions.

5. The method of claim 1, wherein the one-time request is an extensible markup language (XML) Configuration Access Protocol GET request.

6. The method of claim 1, wherein at least one of creating a first subscription, receiving a second subscription request, sending a one-time request, receiving an authorization response and creating a super-subscription is performed at a resource list server.

7. The method of claim 1, wherein the one-time request includes the address of the list and the identity of the second user.

8. A system for sharing subscriptions to the state of a resource list, the system comprising:
    a plurality of users including a first user, a second user, and a third user;
    an extensible markup language Configuration Access Protocol (XCAP) server; and
    a resource list server (RLS) coupled to the first user, the second user, the third user and to the XCAP server, wherein the RLS is configured to create a first subscription to the content of a resource list upon receipt of a first subscription request for the presence state of the resource list from the first user, receive a second subscription request for the presence state of the resource list from the second user, send a one-time request with the identity of the second user to the XCAP server, receive an authorization response related to the one-time request, the authorization response accepting or rejecting the second subscription request based on the authorization response and create a super user subscription to the resource list if the authorization response is accepted, the super user subscription providing information about the content of the resource list, and using the list content information to provide presence state information about resource list members to the first user and the second user, thereby consolidating a plurality of subscriptions into the super user subscription.

9. The system of claim 8, wherein the super user subscription is the only subscription to the resource list between a resource list server and an extensible markup language (XML) Configuration Access Protocol server.

10. The system of claim 9, wherein the super user subscription replaces the first subscription at a refresh time.

11. The system of claim 8, wherein the first subscription and the super user subscription are Session Initiation Protocol subscriptions.

12. The system of claim 8, wherein the one-time request is an extensible markup language (XML) Configuration Access Protocol GET request.

13. A computer program product for sharing subscriptions to the content of a resource list, the computer program product comprising:
    a tangible storage medium readable by a processing circuit and storing instructions for execution by the processing circuit for facilitating a method including:
    creating a first subscription to the content of the resource list upon receipt of a first subscription request for the presence state of the resource list from a first user;
    receiving a second subscription request for the presence state of the resource list from a second user;
    sending a one-time request with the identity of the second user to an extensible markup language configuration access protocol (XCAP) server;
    receiving an authorization response related to the one-time request, the authorization response; accepting or rejecting the second subscription request based on whether the one-time request was authorized;
    creating a super user subscription to the resource list to replace the first subscription, the creating responsive to the second subscription request being accepted;

using the super user subscription to provide content of the resource list to the first user and the second user, and for all subsequent accepted subscription requests for the presence state of the resource list, thereby consolidating a plurality of subscriptions into the super user subscription; and upon receipt of any subsequent subscription request for the presence state of the resource list from a subsequent user, sending the one-time request with the identity of the subsequent user to the XCAP server, and accepting or rejecting the subsequent subscription request based on whether the one-time request was authorized.

14. The computer program product of claim 13, wherein the super user subscription is the only subscription to the resource list between a resource list server and an extensible markup language (XML) Configuration Access Protocol server.

15. The computer program product of claim 14, wherein the super user subscription replaces the first subscription at a refresh time.

16. The computer program product of claim 13, wherein the first subscription and the super user subscription are Session Initiation Protocol subscriptions.

17. The computer program product of claim 13, wherein the one-time request is an extensible markup language (XML) Configuration Access Protocol GET request.

* * * * *